US005482663A

United States Patent [19]
Hammer et al.

[11] Patent Number: 5,482,663
[45] Date of Patent: Jan. 9, 1996

[54] CYLINDRICAL BODY AND METHOD AND APPARATUS FOR MAKING SAME

[75] Inventors: Floyd V. Hammer, Union, Iowa; John A. Rude, Arlington, Tex.; Brian Harper, Iowa Falls, Iowa

[73] Assignee: Hammer's Inc., Iowa Falls, Iowa

[21] Appl. No.: 145,342

[22] Filed: Oct. 29, 1993

[51] Int. Cl.$^6$ .............................. B29B 17/00; B29C 71/00
[52] U.S. Cl. ........................ 264/40.5; 264/323; 264/347
[58] Field of Search ................................ 264/40.5, 323, 264/347

[56] References Cited

U.S. PATENT DOCUMENTS

| | | | |
|---|---|---|---|
| 4,538,657 | 9/1985 | Tuggle | 152/375 |
| 4,828,474 | 5/1989 | Ballantyne | 264/40.5 |
| 5,051,285 | 9/1991 | Borzakian | 428/36.4 |
| 5,082,604 | 1/1992 | Valyi | 264/40.5 |

*Primary Examiner*—George F. Lesmes
*Assistant Examiner*—Kathryne E. Shelborne
*Attorney, Agent, or Firm*—Zarley, McKee, Thomte, Voorhees, & Sease

[57] ABSTRACT

Apparatus for molding an elongated cylindrical object includes an elongated cylindrical mold. First and second closure plates are positioned within the mold and an elongated tube is suspended between the closure plates within the mold. A sliding piston is mounted over the elongated tube. Molten plastic is introduced into the mold between the piston and one of the closure plates so as to cause the piston to slide along the tube within the mold toward the opposite closure plate. When the mold is filled, the piston engages the opposite closure plate, and further introduction of molten plastic is stopped. This process produces an elongated plastic body having the tube embedded therein.

5 Claims, 1 Drawing Sheet

CYLINDRICAL BODY AND METHOD AND APPARATUS FOR MAKING SAME

BACKGROUND OF THE INVENTION

The present invention relates to a large, typically cylindrical, plastic body and a method and apparatus for making same.

Molding of large plastic objects presents many difficulties. When injection molding is used, very high pressures in excess of 5,000 pounds per square inch are required. These pressures create difficulties because the molds must be massively constructed in order to avoid the danger of mold failure. The massive construction of molds adds to the expense of the molds and results in molds which are difficult to handle.

It is therefore desirable to be able to mold large plastic objects at lower pressures and by so doing reduce the stress on the molds. This allows molds to be formed of lighter construction and reduces the difficulties in the manufacturing and handling of the molds.

Therefore a primary object of the present invention is the provision of an improved method and apparatus for making a large cylindrical plastic body.

A further object of the present invention is the provision of a method and apparatus for making a large plastic body having an elongated metal tube extending along its axial length.

A further object of the present invention is the provision of a method and apparatus for making a large plastic body which has a length up to greater than 20 feet and a cross-sectional area up to greater than 200 square inches.

A further object of the present invention is the provision of an improved apparatus and method for molding a plastic body wherein the molding operation is accomplished at very low pressures of less than 1,000 PSI.

A further object of the present invention is the provision of an apparatus and method for making a body, typically cylindrical, which is efficient in operation, simple in construction, and durable in use.

THE SUMMARY OF THE INVENTION

The foregoing objects are accomplished by utilizing a screw extruder which extrudes plastic under relatively low mold pressures of less than 1,000 PSI. Preferably these mold pressures are between 300 PSI and 1,000 PSI but they can be lower without detracting from the invention. The particular recycled plastics which can be molded are preferably a combination of high density polyethylene (HDPE), low density polyethylene (LDPE), and polypropylene (PP). A preferred combination of these materials is 60–70% by weight HDPE, 30–40% by weight LDPE and 0–10% by weight PP. A foaming agent such as an exothermic diazoamide manufactured by Uniroyal under the trademark Celogen may optionally be added to control the density of the molding material during molding. Colorants such as carbon black may be added to provide resistance to degradation by the ultraviolet light of the sun. A 2.0 to 2.5% concentration of carbon black is preferred. If a color other than black is desired then in addition to the desired colorant, ultraviolet absorbers such as manufactured by Hoescht Chemical Company under the trademark Chemisorb 944 may be used. While the above percentages are preferred, the percentages can be varied substantially and various combinations of the above three plastics and colorants can be used without detracting from the invention.

The LDPE has a low glass transition point below 0° F. and imparts low temperature elasticity to the molding material. The HDPE has a higher glass transition point, but imparts strength. The PP imparts hardness, but must be kept in lower percentages because its glass transition point is quite high (approximately 32° F.). The use of a foaming agent eliminates large voids, minimizes cracks during curing and coating, and imparts the ability of the plastic to absorb compression.

The object to be molded is an elongated body, typically cylindrical, having a cross-sectional area up to greater than 200 square inches and a length up to greater than 20 feet. Objects larger than 200 square inches in cross-sectional area and 20 feet in length can be molded by this process.

The process involves taking an elongated cylindrical mold having a mold bore extending axially there through. Detachably mounted over one end of the mold is a first closure plate which covers one end of the mold. The first closure plate includes a stub shaft which projects axially into the mold. And also includes a passage way through which molten plastic may be injected from outside the mold into the interior of the mold.

An elongated tube is then inserted into the mold along the axial center of the mold. The tube includes external threads at one of its ends and at the opposite end includes a sleeve having internal threads mounted on the inner cylindrical surface thereof. The sleeve is of slightly greater diameter then the remainder of the tube.

The tube is inserted into the mold and the sleeve is fitted over the stub shaft projecting from the first closure plate.

Slideably fitted over the external surface of the tube are a pair of pistons. One of the pistons includes a cylindrical stem having an internal diameter sized to fit over the external surface of the sleeve on the tube. The other piston has a stem with an internal diameter sized to fit over the smaller diameter of the remainder of the tube. The internal diameter of the larger stem is sized to telescopically fit over the external diameter of the stem of the other piston.

After the tube with the two pistons mounted thereon is fitted over the stub shaft of the first closure plate, a second closure plate is inserted into the mold. The second closure plate also has an axially projecting stub shaft which is sized to fit within the end of the tube having external threads thereon. A locking rod extends through the center of the tube and is mechanically attached to the first and second closure plates so as to hold the first and second closure plates against the opposite ends of the tube. The second closure plate is free to slide within the inside of the mold to accommodate tubes of varying lengths. By this means cylindrical objects of various lengths can be molded within the same cylindrical mold. The second closure plate also carries means for sensing when the space between the first and second closure plates is filled with plastic.

An end plate is then attached over the open end of the cylindrical mold. A rubber gasket produces a hermetic seal between this end plate and the end of the mold. The end plate carries a pressure controlling valve and a connector for the device on the second closure plate for detecting when the mold is full.

After the mold assembly is complete the entire assembly is placed with the passageway of the first closure plate in communication with the extrusion die of an auger extruder. A pressure cylinder, either pneumatic or hydraulic, holds the entire mold assembly against the extruder.

At the commencement of the molding operation the first piston is fitted over the sleeve and includes a flat surface which abuts against the first closure plate. The second piston is positioned with its stem in abutment against the axial end of the sleeve on the tube. As the molten plastic is introduced into the mold cavity, the first piston slides on the sleeve toward the second piston, and ultimately the stem of the first piston telescopes over the stem of the second piston. The two pistons then continue moving axially along the length of the mold as the mold is filled. If uniform filling does not occur, the air pressure in the unfilled portion of the mold can be regulated to load the two telescoped pistons so as to produce a uniform flow.

When the molten plastic has filled the mold cavity, the second piston is forced against the second closure plate, and the sensor on the second closure plate stops the introduction of molten plastic. The end plate is removed and the sensor disconnected for use on the next molding cycle. The filled mold is then permitted to cool and harden.

After the plastic has hardened the first closure plate is unfastened from the mold tube and the molding is removed from the mold tube. The connecting rod through the elongated tube is then removed and the plates and pistons are removed from the tube leaving the molding ready for further processing or assembly.

DETAILED DESCRIPTION OF THE PREFERRED EMBODIMENT

Figure 1:
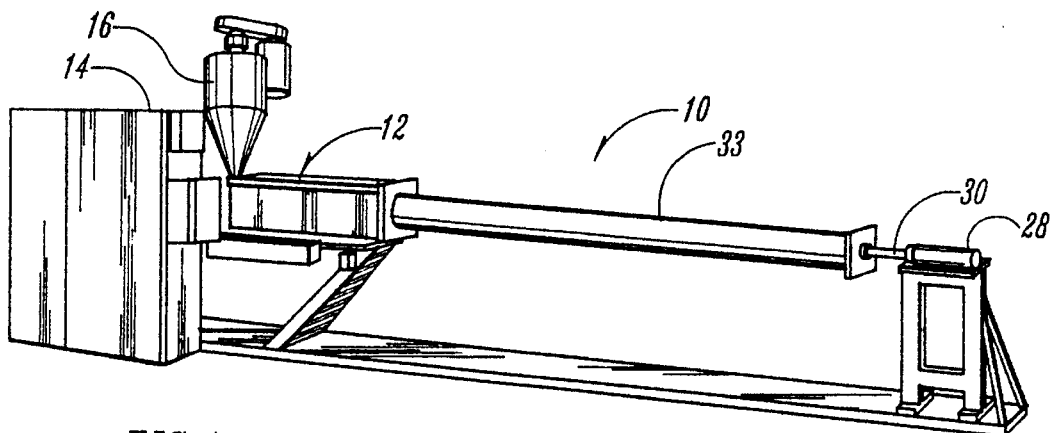
FIG. 1 is a perspective view of the molding apparatus of the present invention.

Referring to the drawings the numeral 10 refers to the molding system used for making the cylindrical body of the present invention. Molding system 10 includes a screw extruder 12 which has a control panel 14 and a hopper 16 for introducing plastic materials to the screw extruder 12. A mold assembly 33 has one end fitted against the outlet end or die 13 of the screw extruder 12. The mold assembly 33 is held in place by a hydraulic or pneumatic cylinder 28 having a piston rod 30 pressing the mold assembly 33 against the outlet end 13 of the screw extruder 12.

Figure 2:
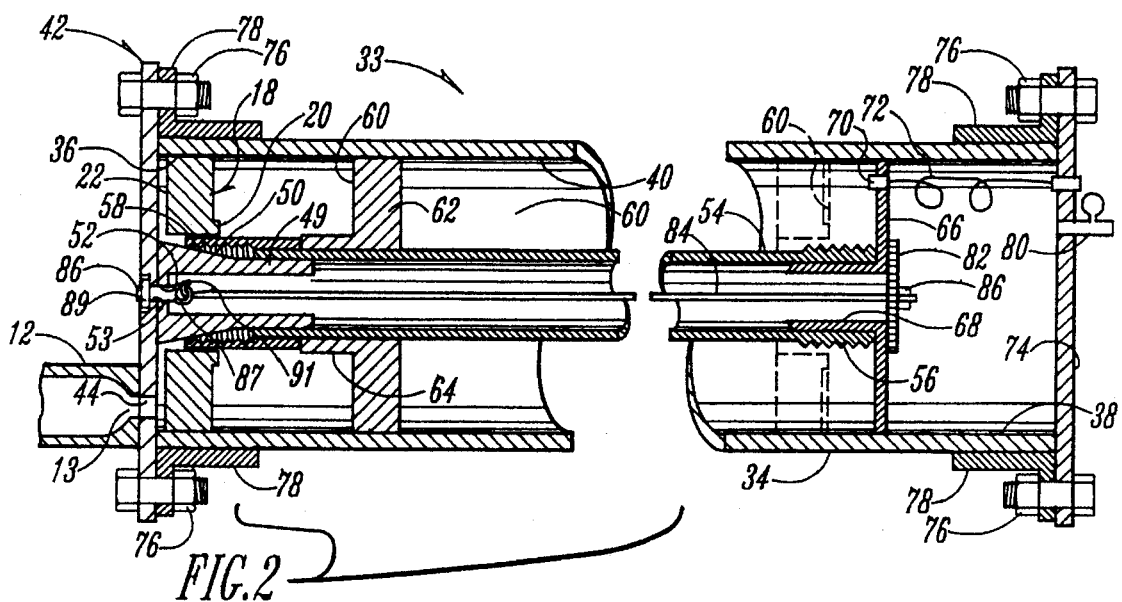
FIG. 2 is a longitudinal sectional view of the mold used to mold the cylindrical body in accordance with the present invention.

Referring to FIG. 2, the mold assembly 33 includes an elongated cylindrical mold 34 having first and second ends 36, 38 and having an elongated mold bore 40 extending there through. Fitted over first end 36 of mold 34 is a first closure plate 42 which has a mold inlet opening 44 therein which is registered with and held tightly against outlet end or die 13 of screw extruder 12.

A mounting mandrel 49 having a frusto-conical portion 50 is shown attached to the interior surface of closure plate 42. The mounting mandrel 49 can be welded or otherwise secured to plate 42, or can be separate from plate 42. Extending axially through mandrel 49 is a rod receiving opening 52 which is aligned with a similar opening 53 in closure plate 42. A bolt 86 having an eye 87 on one end and a nut 89 threaded on the other end extends through openings 52, 53.

Mandrel 49 is inserted within one end of an elongated tube 54 having a threaded end 56 and having a tube sleeve 58 welded or otherwise mounted on the other end thereof. Tube sleeve 58 includes internal threads therein which are sized to threadably receive the threaded end 56 of a second tube similar to tube 54.

Slideably fitted over sleeve 58 is a first piston 18 having a stem or shank 20. First piston 18 also includes a flat surface 22 which faces and engages first closure plate 42.

Also slideably fitted over tube 54 is a second piston 60 having a piston stem or shank 62 which slideably embraces the tube 54. The axial end 64 of stem 62 abuts against the end of sleeve 58. The internal diameter of stem 20 of first piston 18 is sized to telescope over the external diameter of stem 62.

A second closure plate 66 includes a cylindrical shank or stem 68 which is inserted within the threaded end 56 of tube 54.

A locking rod 84 has a hook 91 on one end hooked through eye 87 of bolt 89. Rod 84 extends through the tube 54, and through the shank 68 of second closure plate 66. A locking plate 82 is fitted over the end of rod 84 and is held in abutting engagement against the second closure plate 66 by means of a threaded nut 86 which is mounted on the opposite end of rod 84.

A sensor 70 is mounted to second closure plate 66 for sensing when the piston 60 is in its right-hand position shown in shadow lines in FIG. 2. A sensor wire 72 leads from the sensor 70 and is ultimately connected to the control panel 14.

Mounted over the second end 38 of mold 34 is an end plate 74 which is held in place by connecting bolts 76 to ears 78 on the outer surface of mold 34. An air escape valve 80 is provided in end plate 74 for permitting air to escape from the interior bore 40 of mold 34.

The molding process is as follows. Pistons 18 and 60 are slideably mounted over the elongated tube 54 so that they are free to slide between the opposite ends thereof. The closure plates 42, 66 are mounted to the opposite ends of tube 54 by inserting the mandrel 50 and the shank 68 into the opposite ends of tube 54. Rod 84 is then used to connect the closure plate 42, the mandrel 49, the tube 54, and the second closure plate 70 together with the nuts 86 being threaded on the opposite ends of rod 84, and with the locking plate 82 being pressed against the outside surface of closure plate 66. It should be noted that when the nuts 86 are mounted on the ends of rod 84, the tube sleeve 58 engages the frusto-conical portion 50 of mandrel 49 in a position wherein the sleeve 58 is spaced axially a short distance away from the first closure plate 42. This results in a slight conical opening 90 being formed in the molded body 88 which results from the present process.

The pistons 18 and 60 are then moved to their first position shown in solid lines in FIG. 2 wherein flat surface 20 of piston 18 abuts against first closure plate 42 and the axial end 64 of piston 60 abuts against sleeve 58. The assembly is then inserted into the bore 40 of the mold 34 to the position shown in FIG. 2. Bolts 78 are then used to attach first closure plate 42 over the end of mold 34.

The extruder 12 is then actuated to produce molten plastic material which is introduced through the conduit 32 and the inlet opening 44 to the space between piston 18 and first closure plate 42. This molten plastic material is introduced at very low pressures, and the mold pressure within mold assembly 33 is kept below 1,000 pounds per square inch. As the molten material fills the mold 34, it presses against the piston 18 and causes the piston to begin sliding along the sleeve 58 towards the second piston 60, until the stem 20 of first piston 18 has telescoped over the stem 62 of piston 60. The two pistons continue moving together toward the opposite end of tube 54. The pistons 18 and 60 have sufficient resistance to the build up of molded material within the mold 34 so that the molded material completely fills the annular space surrounding the tube 54. Resistance can also be adjusted by using valve 80 to adjust the build up of air pressure in the unfilled end of mold assembly 33. When the piston 60 is forced against the sensor 70, the sensor 70 causes the control panel 14 to stop the introduction of molded plastic to the mold. It should be noted that in this position that the telescoped pistons 18, 60 occupy a small axial length of the tube 54 so as to prevent the molten plastic from engaging the outer axial end of the threaded portion 56 on tube 54.

Figure 3:
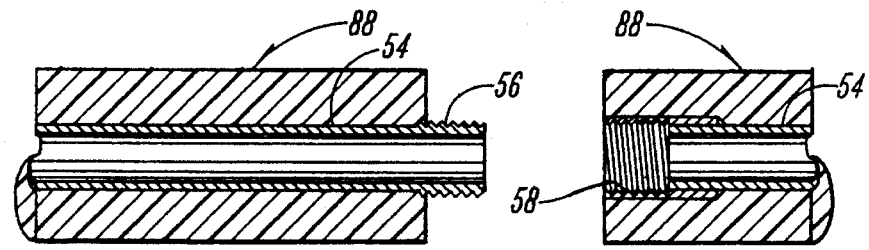
FIG. 3 is a sectional view of two molded bodies produced by the present invention, showing the differences between the opposite ends thereof.
Figure 4:
FIG. 4 is a perspective view showing several molded bodies which can be attached to one another in end to end relationship.

After the plastic has cured and hardened, the closure plate 42 is detached from the mold 34, and the entire molded body can be removed from the mold 34. This removal is enhanced by virtue of a slight shrinkage which occurs in the plastic as it cures. After the molded body 88 has been removed from the mold 34, the bolts 86 are removed, and the closure plates 42, the mandrel 49, the second closure plate 66, and the pistons 18, 20 are removed from the molded body. This leaves a molded body 88 having the tube 54 embedded therein as shown in FIGS. 3 and 4. Numerous molded bodies 88 may be threaded together by inserting threaded ends 56 into the threaded tubular sleeve 58 and threading them together.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

I claim:

1. A method for molding an elongated cylindrical object having an elongated member embedded within a cylindrical plastic body, said method comprising:

taking an elongated cylindrical mold having a mold bore extending therethrough;

mounting first and second sliding pistons on said elongated member for sliding movement on said elongated member between the opposite ends thereof;

suspending said elongated member within said mold bore between first and second spaced apart closure plates with said first and second sliding pistons on said elongated member, said first and second closure plates closing off said mold bore so as to form a mold cavity therebetween with said elongated member and said first and second pistons within said mold cavity;

positioning said first and second pistons in a first position on said elongated member adjacent said first closure plate;

introducing molten plastic into said mold cavity between said first closure plate and said first and second pistons whereby said first and second pistons will slide on said elongated member toward said second closure plate in response to said introduction of molten plastic;

ceasing introduction of molten plastic to said mold cavity when said first and second pistons are in a second position adjacent said second closure plate.

2. A method according to claim 1 and further comprising sensing when said first and second pistons are in said second position with sensor means located adjacent said second closure means.

3. A method according to claim 1 comprising using an elongated cylindrical mold which has a cross sectional area of at least seventy-five square inches and which is longer than ten feet in length.

4. A method according to claim 1 comprising permitting said molten plastic to cure and harden, and removing said first closure plate, said second closure plate, and said first and second pistons from said elongated member.

5. A method according to claim 1 wherein said molten plastic is introduced into said mold cavity at a pressure of less than 1,000 PSI.

* * * * *